US007543827B2

(12) United States Patent
Mantsinen

(10) Patent No.: US 7,543,827 B2
(45) Date of Patent: Jun. 9, 2009

(54) LIFTING DEVICE

(76) Inventor: Hannu Mantsinen, Kalliolantie 7, 83100 Liperi (FI)

( * ) Notice: Subject to any disclaimer, the term of this patent is extended or adjusted under 35 U.S.C. 154(b) by 438 days.

(21) Appl. No.: 10/526,752

(22) PCT Filed: Sep. 5, 2003

(86) PCT No.: PCT/FI03/00650

§ 371 (c)(1),
(2), (4) Date: Sep. 16, 2005

(87) PCT Pub. No.: WO2004/022473

PCT Pub. Date: Mar. 18, 2004

(65) Prior Publication Data

US 2006/0175850 A1 Aug. 10, 2006

(30) Foreign Application Priority Data

Sep. 6, 2002 (FI) ................................. 20021588

(51) Int. Cl.
*B62D 21/00* (2006.01)

(52) U.S. Cl. .................. 280/43.12; 180/65.6; 180/54.1; 414/785

(58) Field of Classification Search ................. 414/785; 180/65.6, 54.1; 280/43.12
See application file for complete search history.

(56) References Cited

U.S. PATENT DOCUMENTS

| | | | | |
|---|---|---|---|---|
| 3,452,887 | A * | 7/1969 | Larson et al. | 414/486 |
| 3,709,394 | A | 1/1973 | Strangberg et al. | 214/750 |
| 4,027,771 | A * | 6/1977 | Adams | 414/495 |
| 4,287,959 | A * | 9/1981 | Inman | 180/12 |
| 5,769,595 | A * | 6/1998 | Pearce et al. | 414/661 |
| 5,829,948 | A * | 11/1998 | Becklund | 414/607 |
| 6,260,646 | B1 * | 7/2001 | Fernandez et al. | 180/65.6 |
| 7,114,906 | B1 * | 10/2006 | Baumgarner et al. | 414/495 |
| 2003/0108413 | A1 * | 6/2003 | Pemberton | 414/685 |
| 2003/0110849 | A1 * | 6/2003 | Lonzinski et al. | 73/121 |
| 2006/0156929 | A1 * | 7/2006 | Nelson et al. | 99/348 |
| 2007/0237612 | A1 * | 10/2007 | Mammome et al. | 414/420 |

FOREIGN PATENT DOCUMENTS

| | | |
|---|---|---|
| DE | 2 101 429 | 8/1972 |
| WO | WO 02/100760 | 12/2002 |

* cited by examiner

*Primary Examiner*—Saúl J Rodríguez
*Assistant Examiner*—Joshua I Rudawitz
(74) *Attorney, Agent, or Firm*—Harrington & Smith, PC

(57) ABSTRACT

The present invention relates to a lifting device which comprises a frame part (1), a transversal support (3) attached to one end of the frame part and lifting arms (4) attached to the transversal support in a distance from each other, which lifting arms are removable under a load to be lifted as well as a transporting equipment (5) placed in lifting arms for moving the lifting arms on a surface. The lifting device in accordance with the invention comprises drive mechanisms (6) placed in lifting arms for driving the transporting equipment in lifting arms (4) separately and for steering the lifting arms.

8 Claims, 2 Drawing Sheets

LIFTING DEVICE

FIELD OF THE INVENTION

The present invention relates to a lifting device which comprises a frame part, a transversal support attached to one end of the frame part and lifting arms attached to the transversal support in a distance from each other, which lifting arms are removable under a load to be lifted as well as transporting equipment placed in lifting arms for moving the lifting arms on a surface.

BACKGROUND OF THE INVENTION

By means of lifting devices attached to cranes, many goods are lifted and moved for example in ports, warehouses and many other places. Various kinds of pallets on which products, goods, equipment and so on are placed are usually moved with the so called pallet trucks. Typically, there are lifting arms, that is a so-called fork, in pallet trucks, which is comprised of two or several mainly horizontal arms. In pallets, there is a bottom on which goods are placed and under the bottom, there are supports projecting downwards. The pallet lies on the ground on its supports such that between the surface of the ground and the bottom of the pallet there remains a space where lifting arms of a pallet truck may be pushed. The space is somewhat higher than lifting arms such that lifting arms fit into this space. By means of pallet and other trucks also other kind of loads besides pallets may, naturally, be lifted. It is essential that under a load there is a space into which lifting arms of a lifting device may be pushed. For example, wood is moved in great quantities by means of various lifting devices from one place to another while loading, for instance, wood. There are also other kinds of lifting devices functioning by means of their own power source, which devices are moved and employed without cranes or similar.

While employing present lifting devices a person is usually always needed on the lifting/moving place or on the ground to place the lifting arms on place. While a lifting device is moved with a crane and it rests on transporting equipment and lifting devices of the crane, it is possible to lower it down on the right place relatively exactly such that the lifting arms are at the point of the pallet or similar, but while moving the lifting arms to the space under the pallet or a load there may be difficulties because the space is relatively small and the lifting arms must be in the air off the base while moving the lifting device. After moving the pallet or some other load is placed to the desired place and the lifting arms are pulled from under the pallet or similar. Usually, at this point, also a person present there is needed to guide/help to take the lifting arms from under the pallet or similar. The problem is that with a crane, lifting arms may not be moved and placed exactly, reliably and fast under the pallet or similar to the right place and/or removed after transporting without the help of a person present there. This person has to put lifting arms in place and to remove them. These people must often work in relatively narrow places and lifting devices are of great size and heavy, especially while moving pallets or similar loads. In this kind of places, hazardous situations may occur and special attention must be paid on safety at work. While a separate lifting device with its own power source is employed, there must be a worker near the lifting device.

SUMMARY OF THE INVENTION

The object of the invention is to present a lifting device with the use of which disadvantages related to present lifting devices are eliminated. Especially, the object of the invention is to present a lifting device which may be employed and which may be driven to the place by employing a remote control and without a person on the ground.

The object of the invention is accomplished by a lifting device, the characteristics of which are presented in the claims.

The lifting device in accordance with the invention comprises drive mechanisms placed in lifting arms for driving transporting equipment in lifting arms separately and for steering the lifting arms. By means of special transporting equipment in lifting arms, the lifting device and the lifting arms may be moved along the surface of the base. In this case, the lifting arms do not get stuck while moved to the bottom of the pallet and hazardous situations do not occur. By means of transporting equipment and drive mechanism, the lifting device may be moved to both desired directions by its own means quickly, without trouble and without assistance of a person. By means of drive mechanism the movement sideways may be controlled by controlling the motion of various transporting equipment in lifting arms in as such recognized way, for example, by using the one transporting equipment more quickly than the other, in which case the lifting device may be steered to the desired direction. By controlling separately but simultaneously both transporting equipment, the same kind of track steering as in tracked vehicles is achieved.

In an advantageous application of the invention, there are wheels, rollers or tracks attached to lifting arms and a drive mechmanism has been connected to at least one of these for moving it. By means of wheels, the lifting arms may be moved especially on a hard ground, such as sand, well and quickly. Rollers may be employed for example on factory grounds or on other grounds where there is a hard and even surface, such as concrete or asphalt. For truck cranes, a track application would be a functional solution. The size, number and position of wheels, rollers or tracks may vary remarkably in various applications of the invention. One or several wheels/rollers/tracks functions as pulling/pushing wheel while the other wheels may rotate freely.

In an advantageous additional application of the invention, the transporting equipment comprises two or more wheels and a transmission element between those, which transmission element has been connected to the drive mechanism. By employing the transmission element the number of transporting wheels may be as desired.

In the next advantageous application of the invention, the transporting equipment comprises an endless belt-like element. An endless belt-like element refers, in this connection, to various recognized endless elements, such as a belt, chain, system of tracks and so on. In this kind of solution lifting arms and a lifting device may efficiently be moved also on a soft base as the weight is divided evenly on the belt-like element.

In the next advantageous application of the invention the outer ends of lifting arms are bevel backwards and downwards, and at least one wheel is placed at the beveled point. This kind of construction facilitates to move lifting arms under and underneath pallet/load.

BRIEF DESCRIPTION OF THE DRAWINGS

Next, the invention will be explained in more detail with reference to the accompanying drawings, in which.

DETAILED DESCRIPTION OF THE INVENTION

Figure 1:
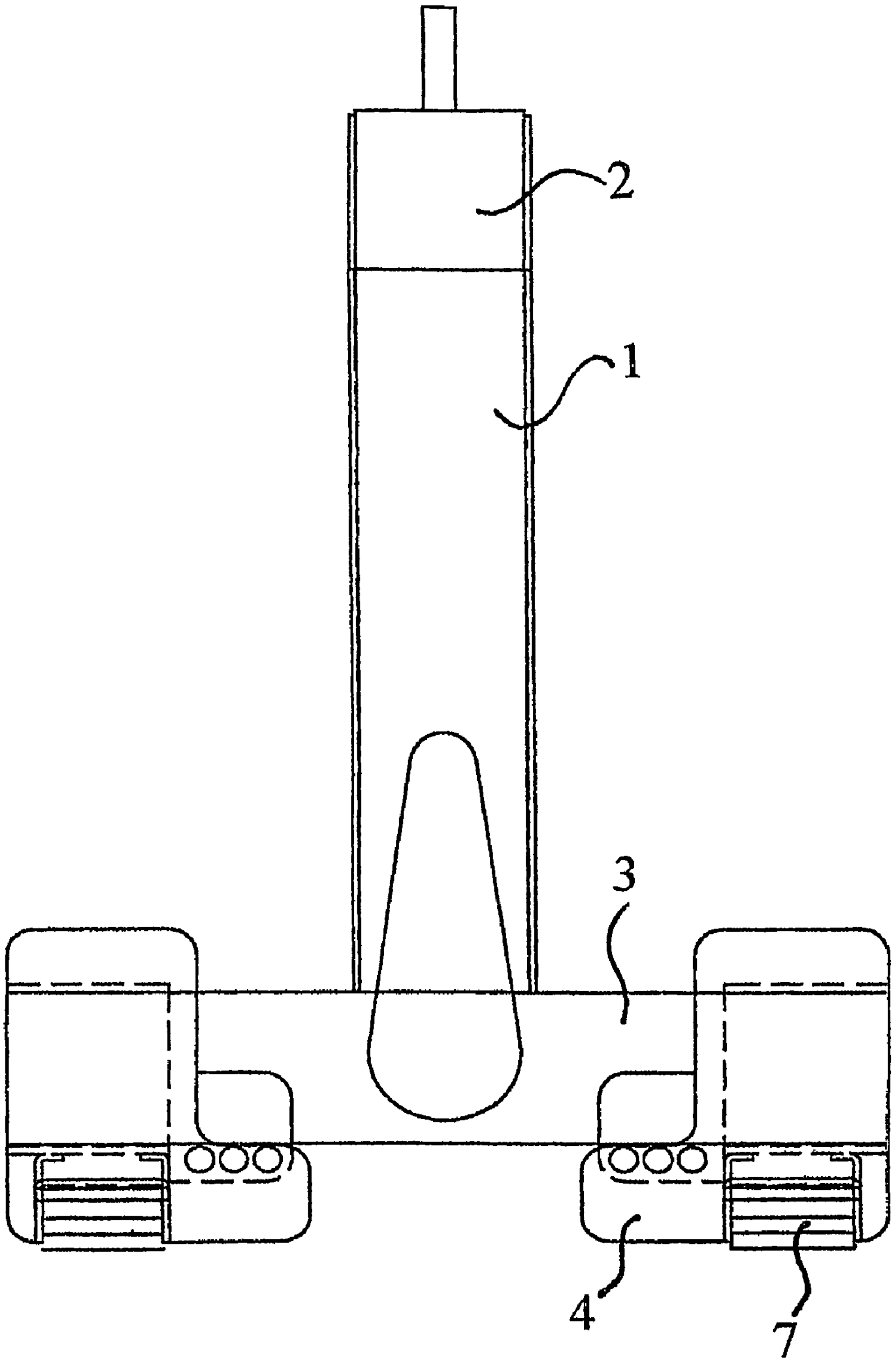
FIG. 1 illustrates an application of a lifting device in accordance with the invention viewed from the front.

In the application in accordance with figures the lifting device comprises a bar-like frame part 1, an attaching part 2 attached to one end of it, a transversal support 3 attached to the other end, and lifting arms 4 (a fork) attached to the transversal support in a distance from each other, transporting equipment 5 placed in lifting arms and a drive mechanism 6 or mechanisms for driving the transporting devices. The attaching part 2 comprises a bar reaching forward from the frame part and a part equipped with attaching elements attached on it, to which part a lifting device of a crane may be removably attached. The attaching part 2, the frame part 1 and the transversal support 3 are as such recognized, conventional parts, and therefore there is no need to describe those in more detail. The shape and construction of those may vary conventionally in various applications.

A recognized motor suitable for the purpose is employed as a drive mechanism. It may be a hydraulic, electric or some other motor.

There are wheels 5 (or rollers or tracks) attached to lifting arms in a distance from each other. The wheels have been connected to lifting arms with shafts such that they are placed somewhat lower than the lower surface of the lifting arm and carry the lift while it is on the ground or on a base. There is a drive mechanism 6 at the point of the lifting arm on the lower part of the transversal support, which drive is as such a recognized motor. In addition, the device comprises an endless belt 7, chain or similar, employed as a transmission element, which belt has been connected to the drive mechanism 6 and has been organized to reach from one end of the lifting arm to the other end in the upper part and to go round the wheels in the lower part. The outer ends 8 of lifting arms 4 are bevel downwards and backwards and at least one wheel is placed at the beveled point.

Figure 2:
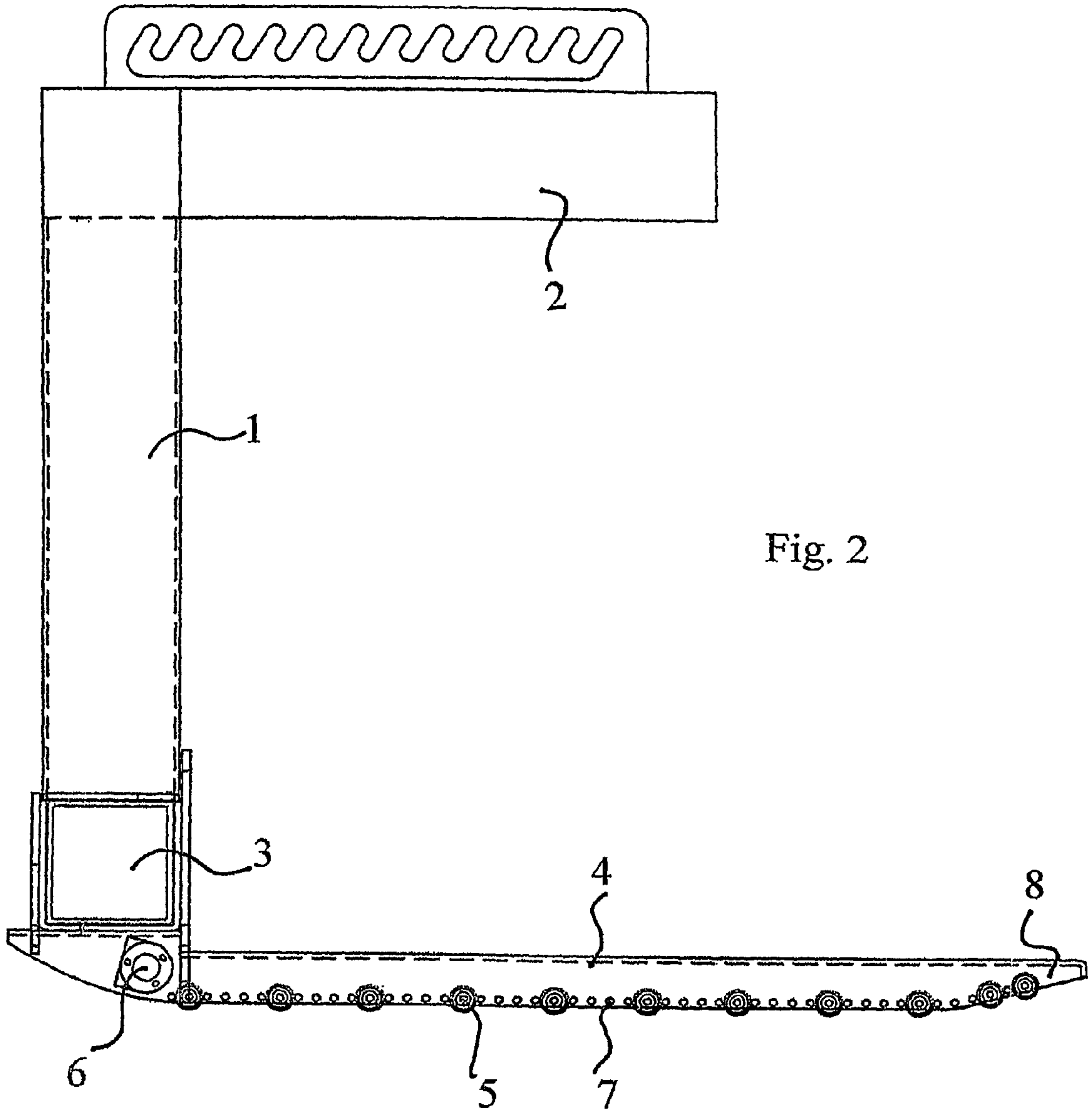
FIG. 2 illustrates a partial cross-section of a lifting device in accordance with the FIG. 1 viewed from the side.

In the application in accordance with FIG. 2 the lifting device comprises a drive mechanisms 6 placed in the lifting arms for driving the transporting equipment separately in the lifting arms 4. An endless belt 7 has been organized to move inside the lifting arm and it has been connected to the wheels 5. It is also possible to place the endless belt in a recess between elevations or similar formed on the upper surface of the lifting arm.

While employing a lifting device in accordance with the invention it is taken or driven with a crane next to a pallet or some other load to be lifted and placed on the ground or on some other base such that the lifting arms of the fork of the lifting device are directed towards the pallet or some other load and at the point of the free space under the pallet/some other load. After this a drive mechanism (mechanisms) is started and the endless belt starts rotating and rotates the wheels in the lifting arm. In that case, the lifting arms and the whole lifting device move on the wheels towards the pallet. Mutual speed relation of the wheels placed in the separate lifting arms is controlled by drive mechanisms placed in separate lifting arms for steering the lifting device. In this case, they may be steered also sideways and the lifting arms may be directed under a pallet from desired direction. While the lifting arms are entirely under the pallet/some other load, the pallet/some other load is lifted up by means of a crane and moved to a desired place. In here, the lifting device with the pallet/some other load is lowered down such that the pallet or some other load lies on supports and the lifting arms of the lifting device are placed against the base. After this, the drive is started and the belt is made to rotate to the opposite direction than earlier. In this case, the lifting arms are moved under the pallet/some other load quickly and reliably. The lifting device may quickly be removed to the point of the next pallet/some other load and repeat the earlier said.

In the lifting device in accordance with the invention, there are two lifting arms. In other applications of the invention, the number of lifting arms is not limited, but it may vary as required by pallets to be lifted or by quality of loads. A desired number of lifting arms may be placed side by side.

In the second application of the invention, it does not comprise any attaching part and it does not need any crane while being employed. In this case, it comprises an own motor or some other power unit for lifting a load and for moving and steering the lifting device and a load to desired direction. In other way, the rest of the construction and especially the construction of transporting equipment and drive mechanisms connected with its lifting arms correspond to the construction presented in the earlier presented application.

The lifting device in accordance with invention may be employed in all kinds of lifting and/or moving tasks of material, in which there is a need to place a lifting device under a load. It may act as a lifting auxiliary tool, loading element or also as a lifting or transporting device differing from those.

The invention is not limited to the presented advantageous applications but it can vary within the frames of the idea of the invention formed in the claims.

The invention claimed is:

1. A lifting device, which comprises
- a frame part,
- an attaching part attached to one end of the frame part, wherein the attaching part is configured to have a lifting device of a crane removably attached thereto,
- a transversal support attached to another end of the frame part,
- lifting arms attached to the transversal support in a distance from each other, said lifting arms being configured to be moved under a load to be lifted,
- transporting equipment in the lifting arms for moving the lifting arms on a base,
- drive mechanisms in lifting arms, and
- transmission elements connecting the drive mechanisms to the transporting equipment for driving the transporting equipment in the lifting arms separately and for steering the lifting device.

2. A lifting device in accordance with claim 1, in which the transport equipment includes wheels, rollers or tracks attached to the lifting arms.

3. A lifting device in accordance with claim 1, in which the transporting equipment comprise at least two wheels and the transmission element is connected between the wheels.

4. A lifting device in accordance with claim 1, in which the transporting equipment comprises an endless belt-like element.

5. A lifting device in accordance with claim 1, in which outer ends of the lifting arms are beveled backwards and downwards, and wherein at least one wheel is placed at a beveled point.

6. A lifting device in accordance with claim 2, in which the drive mechanism has been connected to at least one wheel, roller or track for moving the wheel, roller or track.

7. A lifting device comprising:
- a frame part,
- an attaching part attached to the frame part, wherein the attaching part is configured to have a lifting device removably attached thereto,
- a transversal support attached to the frame part,
- a plurality of lifting arms attached to the transversal support, wherein the lifting arms are spaced from each other and are configured to be moved under a load to be lifted, transporting equipment located, at least partially, in each of the lifting arms for moving the lifting arms on a base, drive mechanisms located, at least partially, in lifting arms, and at least one transmission element connecting the drive mechanisms to the transporting equipments in each lifting arm, wherein the drive mechanism and the transmission element in a first one of the lifting arms is configured to drive the transporting equipment in the first lift arm separately relative to driving of the transporting equipment in a second one of the lifting arms by the drive mechanism and the transmission element in the second lifting arm for moving and steering the lifting device.

8. A lifting device comprising:

a frame part, an attaching part attached to the frame part, wherein the attaching part is configured to have a lifting device removably attached thereto, a transversal support attached to the frame part, a plurality of lifting arms attached to the transversal support, wherein the lifting arms are spaced from each other and are configured to be moved under a load to be lifted, transporting equipment located in each of the lifting arms and extending from bottom sides of the lifting arms for moving the lifting arms on a base, a drive mechanism located in a first one of the lifting arms, and a transmission element located in the first lifting arm and connecting the drive mechanism to the transporting equipment in the first lifting arm, wherein the drive mechanism and the transmission element are configured to drive the transporting equipment in the first lift arm for toying and steering the first lifting arm directly on the base.

* * * * *

UNITED STATES PATENT AND TRADEMARK OFFICE

CERTIFICATE OF CORRECTION

PATENT NO. : 7,543,827 B2
APPLICATION NO. : 10/526752
DATED : June 9, 2009
INVENTOR(S) : Hannu Mantsinen It is certified that error appears in the above-identified patent and that said Letters Patent is hereby corrected as shown below:

In Claim 8, Column 6, line 15, delete "toying" and replace with --moving--.

Signed and Sealed this

Twenty-eighth Day of July, 2009

JOHN DOLL
*Acting Director of the United States Patent and Trademark Office*